(12) United States Patent
Tornga et al.

(10) Patent No.: US 10,234,571 B1
(45) Date of Patent: Mar. 19, 2019

(54) RADIATION DETECTOR

(71) Applicant: LOS ALAMOS NATIONAL SECURITY, LLC, Los Alamos, NM (US)

(72) Inventors: Shawn Robert Tornga, Los Alamos, NM (US); Markus Peter Hehlen, Los Alamos, NC (US); Edward McKigney, Los Alamos, NM (US); Nickolaus Smith, Los Alamos, NM (US); Christopher Hamilton, Los Alamos, NM (US); Daniel Tyler Wakeford, Los Alamos, NM (US); Jillian Cathleen Adams, Los Alamos, NM (US); Olivia Carol Trautschold, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 0 days.

(21) Appl. No.: 15/799,929

(22) Filed: Oct. 31, 2017

Related U.S. Application Data (60) Provisional application No. 62/415,194, filed on Oct. 31, 2016.

(51) Int. Cl.
*G01T 1/20* (2006.01)
*G01T 1/202* (2006.01)

(52) U.S. Cl.
CPC .......... *G01T 1/2002* (2013.01); *G01T 1/2018* (2013.01); *G01T 1/2023* (2013.01)

(58) Field of Classification Search
CPC .... G01T 1/2002; G01T 1/2018; G01T 1/2023
See application file for complete search history.

(56) References Cited

U.S. PATENT DOCUMENTS

| | | | | |
|---|---|---|---|---|
| 5,600,144 | A * | 2/1997 | Worstell | G01T 1/20 250/363.03 |
| 8,399,849 | B1 * | 3/2013 | Krishnan | G01T 3/06 250/253 |
| 2007/0111321 | A1 * | 5/2007 | Deans | G01N 21/76 436/166 |
| 2015/0369928 | A1 * | 12/2015 | Reese | G01T 1/2018 250/362 |
| 2017/0052265 | A1 * | 2/2017 | Fukuda | G01T 1/20 |

\* cited by examiner

*Primary Examiner* — Hugh H Maupin
(74) *Attorney, Agent, or Firm* — Lewis Roca Rothgerber Christie LLP (57) ABSTRACT

A radiation detector including a scintillator; a wavelength shifting portion to cause a wavelength shift in photons emitted by the scintillator; and a photodetector optically coupled to the scintillator to receive the wavelength shifted photons.

20 Claims, 4 Drawing Sheets

RADIATION DETECTOR

CROSS-REFERENCE TO RELATED APPLICATION(S)

The present application claims priority to and the benefit of U.S. Provisional. Patent Application No. 62/415,194, filed on Oct. 31, 2016, the content of which is incorporated herein by reference in its entirety.

STATEMENT REGARDING FEDERALLY SPONSORED RESEARCH OR DEVELOPMENT

The present invention was made with government support under Contract No. DE-AC52-06NA25396 awarded by the U.S. Department of Energy/National Nuclear Security Administration to Los Alamos National Security, LLC for the operation of Los Alamos National Laboratory. The government has certain rights in the invention.

TECHNICAL FIELD

One or more aspects of embodiments according to the present invention relate generally to the field of radiation detection, and more particularly to the field of high performance, portable or space-based radiation detectors.

BACKGROUND

There is an ever increasing need for smaller, lighter, inexpensive, and higher-fidelity radiation detectors throughout numerous industry and government sectors. Current state-of-the-art detectors utilize bulky photomultiplier tubes that are often prohibitively large and power consuming to engineer into a useful portable product. Silicon-based solid-state photodetectors such as silicon photo-multipliers, avalanche photodiodes and PIN diodes can be attractive alternatives, however their performance can be limited by their inferior spectral overlap with the highest performing scintillators. That is, the wavelength of the light emitted by the scintillator in response to an ionizing radiation source does not coincide with the wavelength of peak response of a more compact photodetector, thus failing to take advantage of the other improvements one might expect from a system using a silicon-based chip-type photodetector.

Accordingly, there is a need in the art for a solution to the foregoing problem in order to solve both industrial and government problems in radiation detection.

SUMMARY

According to an embodiment of the present invention a radiation detector can include a scintillator, including a crystal, glass, liquid, gas or plastic, and a wavelength-shifting portion. The scintillator and the wavelength-shifting portion can be connected and/or co-exist in various alternative embodiments. The scintillator may function to receive incident ionizing radiation in the form of a photon or particle, for example a gamma photon or a neutron, and to emit corresponding scintillation photons in response to the absorption of the ionizing radiation. The wavelength-shifting portion may function to efficiently shift the photons emitted by the scintillator to a wavelength that has an improved spectral overlap with the response of a high performance photodetector. The wavelength-shifting portion can be integral with the scintillator, attached to the scintillator, grown into/onto the scintillator, or any other suitable means or mechanism for optically coupling the photonic output of the scintillator to the wavelength-shifting portion so that the latter emits a photon in the proper spectral region for optimal detection at the photodetector.

According to an embodiment of the present invention, there is provided a radiation detector including: a scintillator; a wavelength shifting portion to cause a wavelength shift in photons emitted by the scintillator; and a photodetector optically coupled to the scintillator to receive the wavelength shifted photons.

The wavelength shifting portion may include a coating including at least two dyes.

The wavelength shifting portion may include a coating including 9.10-Bis(phenylethynyl)anthracene doped, polystyrene (BPEA:PS).

The scintillator may include an YSO:Ce crystal.

The photodetector may include one of a silicon photomultiplier or an avalanche photodiode.

The wavelength shifting portion may include a congruent fabricated structure.

The scintillator may include a hygroscopic scintillator.

The hygroscopic scintillator may include one of: $LaBr_3$:Ce, $LaCl_3$:Ce, CLYC:Ce, or $SrI_2$:Eu.

The photodetector may include one of a silicon photomultiplier, avalanche photodiode or PIN diode.

The scintillator may include LiCAF:Ce and the wavelength shifting portion may include a coating including at least two dyes applied to one or more sides of the scintillator.

An optically reflective material may surround the wavelength shifting portion.

According to an embodiment of the present invention, there is provided a radiation detector. The radiation detector includes: a scintillator; a wavelength shifting portion surrounding at least five sides of the scintillator to cause a wavelength shift in photons emitted by the scintillator; a photodetector optically coupled to the scintillator to receive the wavelength shifted photons; and an optically reflective material surrounding the wavelength shifting portion.

The wavelength shifting portion may include a coating including 9.10-Bis(phenylethynyl)anthracene doped, polystyrene (BPEA:PS).

The scintillator may include an YSO:Ce crystal, and the photodetector may include one of a silicon photomultiplier or an avalanche photodiode.

The wavelength shifting portion may include a congruent fabricated structure, and the scintillator may include a hygroscopic scintillator.

The hygroscopic scintillator may include one of: $LaBr_3$:Ce, $LaCl_3$:Ce, CLYC:Ce, or $SrI_2$:Eu. The photodetector may include one of a silicon photomultiplier, avalanche photodiode or PIN diode.

According to an embodiment of the present invention, there is provided a radiation detector. The radiation detector includes: a scintillator; a wavelength shifting portion surrounding at least five sides of the scintillator to cause a wavelength shift in photons emitted by the scintillator; a photodetector optically coupled to the scintillator to receive the wavelength shifted photons; and a processor coupled to the photodetector, the processor being to identify a radiation source.

The processor may be to further identify a location, quantity, and/or quality of the radiation source in accordance with the wavelength shifted photons The wavelength shifting portion may include a coating comprising 9.10-Bis(phenylethynyl)anthracene doped, polystyrene (BPEA:PS), the scintillator may include an YSO:Ce crystal, and wherein the photodetector may include one of a silicon photomultiplier or an avalanche photodiode.

The wavelength shifting portion may include a congruent fabricated structure, the scintillator may include a hygroscopic scintillator including one of: LaBr$_3$:Ce, LaCl$_3$:Ce, CLYC:Ce, or SrI$_2$:Eu, and the photodetector my include one of a silicon photomultiplier, avalanche photodiode or PIN diode.

BRIEF DESCRIPTION OF THE DRAWINGS

These and other features and aspects of the present invention will be appreciated and understood with reference to the specification, claims, and appended drawings wherein:

DETAILED DESCRIPTION

As described herein, a radiation detector according to various embodiments yields substantial improvements in efficiencies and engineering possibilities by wavelength-shifting a scintillated photon to a portion of the spectrum that is better matched with the quantum efficiencies of today's advanced photodetectors. The following description of the embodiments of the invention is not intended to limit the invention to these embodiments, but rather to enable any person skilled in the art to make and use this invention.

The detailed description set forth below in connection with the appended drawings is intended as a description of exemplary embodiments provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. Further, one of ordinary skill in the art would appreciate that features of one or more embodiments according to the present invention may be combined in a suitable manner to practice other embodiments of the present invention. As denoted elsewhere herein, like element numbers are intended to indicate like elements or features.

Figure 1:
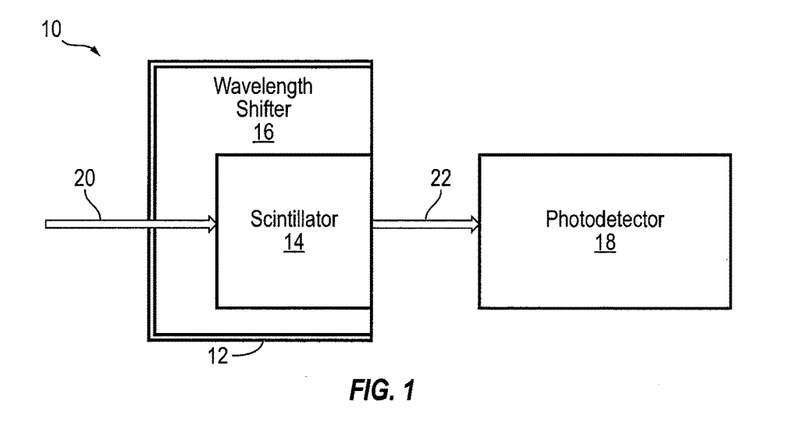
FIG. 1 is a schematic block diagram of a radiation detector in accordance with an embodiment of the present invention.
Figure 2:
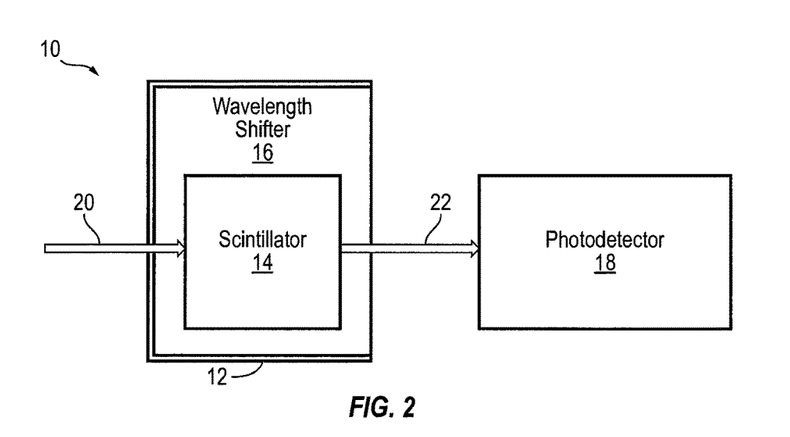
FIG. 2 is another schematic block diagram of a radiation detector in accordance with another embodiment of the present invention.

As shown in FIGS. 1 and 2, a radiation detector 10 according to an embodiment can include a scintillator 14 and a wavelength-shifting portion (e.g., a wavelength shifter) 16 to cause a wavelength shift of the photons emitted by the scintillator 14. The radiation detector 10 can further include a photodetector 18 optically connected to the scintillator 14 to receive the emitted photons. In operation, radiation detector 10 may function to detect the presence of photons or particles through the absorption of photons or particles found in the presence of a source of radiation. In particular, the radiation detector 10 can be packaged in a compact form factor and readily deployed and/or distributed, either by hand or by installation, due to its size and performance. As described in detail below, a radiation detector 10 can include one or more optimized scintillator crystals 14 that are coupled to one or more silicon-based chip-type photodetectors 18 without substantially sacrificing the performance of either component.

As shown in FIGS. 1 and 2, the radiation detector 10 can include a scintillator 14 and a wavelength-shifting portion 16. As described further herein, the scintillator 14 and the wavelength-shifting portion 16 can be connected and/or co-exist in various alternative embodiments. The scintillator 14 may function to receive incident ionizing radiation 20 in the form of a photon or particle, for example a gamma photon or a neutron, and to emit scintillation photons 22 in response to the absorption of the ionizing radiation 20. In related art radiation detectors, the scintillation light emitted by a high-performance scintillator may have a spectral distribution that poorly matches the spectral response of a high performance compact photodetector. In order to solve this problem and take advantage of the innate physical properties of the scintillator 14 and the photodetector 18, the wavelength-shifting portion 16 may function to shift the emitted photons 22 to a wavelength range that is better matched with the spectral response of the photodetector 18. As noted above, the wavelength-shifting portion 16 can be integral with the scintillator 14, attached to the scintillator 14, co-existing with the scintillator 14, grown into/onto the scintillator 14, or any other suitable means or mechanism for optically coupling the photonic output of the scintillator 14 to the wavelength-shifting portion 16 so that the latter emits a photon 22 in the proper wavelength range for optimal detection at the photodetector 18.

FIG. 1 illustrates an embodiment in which the wavelength-shifting portion 16 covers five of the six sides of the scintillator 14 and FIG. 2 illustrates an embodiment in which the wavelength-shifting portion 16 covers all six sides of the scintillator 14.

In one variation of the radiation detector 10, the wavelength-shifting portion 16 includes a coating. The coating can include one or more dyes, and/or be applied or applicable in one or more coats, deposits, or lacquers. As used herein, the term coating should be construed to include any layer or structure applied to a surface of a different layer or structure, i.e. a surface of a scintillator 14 or an optical component, lens, mirror, glass slide, or attachment to the scintillator 14. Alternatively, the coating can be integral with and/or applied to a separate but attachable structure, such as an optical component, that is affixed, affixable, and/or in optical communication or coupling with the scintillator 14.

In one variation of the radiation detector 10, the scintillator 14 can include a cerium doped yttrium silicate (YSO:Ce) crystal. In another variation of the radiation detector 10, the scintillator 14 can include a LiCAF:Ce crystal and the wavelength-shifting portion 16 can include a coating including at least two dyes applied and/or affixed thereto. The wavelength shifting portion may include a congruent fabricated structure. Other suitable scintillators 14 can include, but are not limited to, organic, inorganic, plastic, or hygroscopic crystals, liquids, gases, and/or combinations thereof. At least the following scintillators can be used in one or more embodiments of the radiation detector 10: anthracene, stilbene, naphthalene, polyethylene naphthalate, polyvinyltoluene, polystyrene, polymethylmethacrylate, NaI:Tl, CsI:Tl, CsI:Na, CsI, CsF, KI:Tl, LiI:Eu, $BaF_2$, $CaF2$:Eu, ZnS:Ag, $CaWO_4$, $CdWO_4$, YAG:Ce, YAP:Ce, GSO, LSO, $LaCl_3$:Ce, $LaBr_3$:Ce, LYSO, BGO, YSO:Ce, CLYC:Ce, $SrI_2$:Eu, LiCAF:Ce, or any suitable combination, permutation, or mixture thereof. Other scintillators may be chosen as dictated by the needs of the specific detector application.

As shown in FIG. 1, the radiation detector 10 also includes a photodetector 18 that is optically coupled to the scintillator 14. The photodetector 18 may function to receive at least one emitted photon 22 and convert it into an electrical signal that is indicative of the presence of a radiation source. Those of skill in the art will recognize that the radiation detector 10 can also include electronic and/or computer components (see e.g., FIG. 9) that provide signal processing to assist in determining the presence of a radiation source, and/or the location, quantity, or quality of that radiation source.

Figure 9:
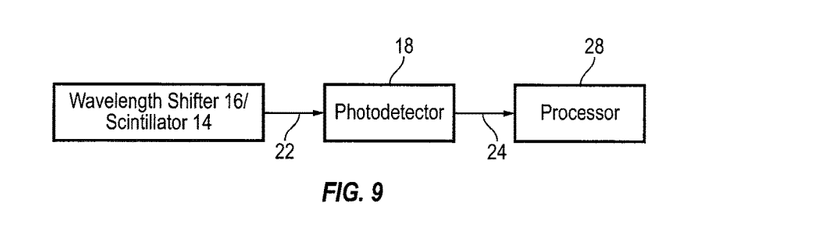
FIG. 9 is a block diagram of a device for detecting radiation, according to embodiments of the present invention.

For example, FIG. 9 is a block diagram of an example embodiment of a device for measuring radiation, according to embodiments of the present disclosure. In FIG. 9, a combined wavelength shifter 16/scintillator 14 sends a photon signal 22 to the photodetector 18. The photodetector 18 then sends a corresponding electronic signal 24 to a signal processor 28 (e.g., via a coaxial cable) to determine the presence of the radiation source and/or the location, quantity, or quality of that radiation source. In some embodiments, additional elements such as amplifiers, filters, etc. may be added to aid in signal transfer and processing, and it will be understood that those of skill in the art are capable of selecting and implementing such additional elements according to the principles described herein.

The photodetector 18 may be directly coupled to the combined wavelength shifter 16/scintillator 14 or may be connected utilizing other means such as a fiber optic cable.

In a variation of the radiation detector 10, the photodetector 18 can include one or more of a silicon photomultiplier or an avalanche photodiode or PIN diode. In other variations of the radiation detector 10, the photodetector 18 can include one or more of a photomultiplier tube, a CMOS image sensor, a charge couple device (CCD), a HgCdTe detector, an LED photodetector, a phototransistor, a quantum dot photoconductor, a quantum dot photodiode, a graphene-silicon photodetector, or any other suitable device or combination of devices that yield a functional signal in response to the receipt of the emitted photon 22. In variations of the radiation detector 10, one or more elements thereof can be arranged in an array or in multiplicities such that one or more of any of the foregoing suitable photodetectors can be used alone or in combination to collect the emitted photon 22.

The radiation detector 10 may further include an optically reflective material 12. The optically reflective material 12, according to the embodiments of FIGS. 1 and 2, is on five sides of the combined wavelength shifter 16/scintillator 14 to reflect light emitted by the scintillator 14 in order to increase the total amount of photon that are incident upon the photodetector 18. While the embodiments of FIGS. 1 and 2 show the optically reflective material 12 on five sides of the combined wavelength shifter 16/scintillator 14, the present invention is not limited thereto and the optically reflective material 12 may be on more or less than five sides.

The preceding description of the embodiments of the invention is not intended to limit the invention to these embodiments, but rather to enable any person skilled in the art to make and use this invention.

Figure 3:
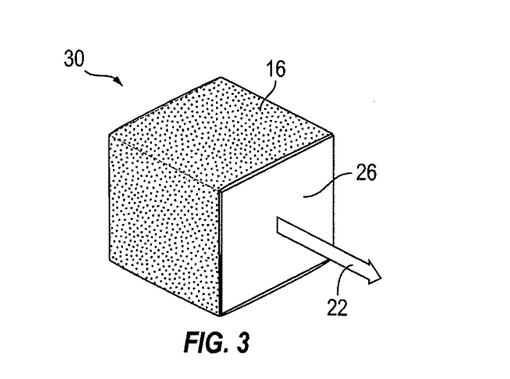
FIG. 3 is a photograph of an example configuration of a radiation detector in accordance with an alternative embodiment of the present invention.

FIG. 3 illustrates a scintillator/wavelength-shifting portion 30 according to one example embodiment of the present invention. As shown, the scintillator/wavelength-shifting portion 30 can include a cerium doped yttrium silicate (YSO:Ce) crystal. Other suitable scintillators 14 can include, but are not limited to, organic, inorganic, plastic, or hygroscopic crystals, liquids, gases and/or combinations thereof. As noted above, other suitable scintillators can include in part one or more of the following crystals: anthracene, stilbene, naphthalene, polyethylene naphthalate, polyvinyltoluene, polystyrene, polymethylmethacrylate, NaI:Tl, CsI:Tl, CsI:Na, CsI, CsF, KI:Tl, LiI:Eu, $BaF_2$, $CaF_2$:Eu, ZnS:Ag, $CaWO_4$, $CdWO_4$, YAG:Ce, YAP:Ce, GSO, LSO, $LaCl_3$:Ce, $LaBr_3$:Ce, LYSO, BGO, YSO:Ce, CLYC:Ce, $SrI_2$:Eu, LiCAF:Ce, or any suitable combination, permutation, or mixture thereof. Other scintillators may be chosen as dictated by the needs of the specific detector application.

As shown in FIG. 3, one example wavelength-shifting portion 16 can include 9,10-Bis(phenylethynyl)anthracene doped polystyrene (BPEA:PS). In a multi-sided scintillator/wavelength-shifting portion 30, the example wavelength-shifting portion 16 is applied to more than one side of the scintillator 14. In the example embodiment shown in FIG. 3, a BPEA:PS layered structure is applied to five sides of a cubical YSO:Ce crystal, and a sixth side includes a BPEA:PS coated glass slide 26 (shown emitting wavelength-shifted light). One of skill in the art will readily appreciate that although a substantially cubical geometry is show in FIG. 3, other suitable geometries for the scintillator 14 and/or wavelength-shifting portion 16 can readily be employed depending upon the engineering constraints and specifications of the radiation detector 10.

Figure 4:
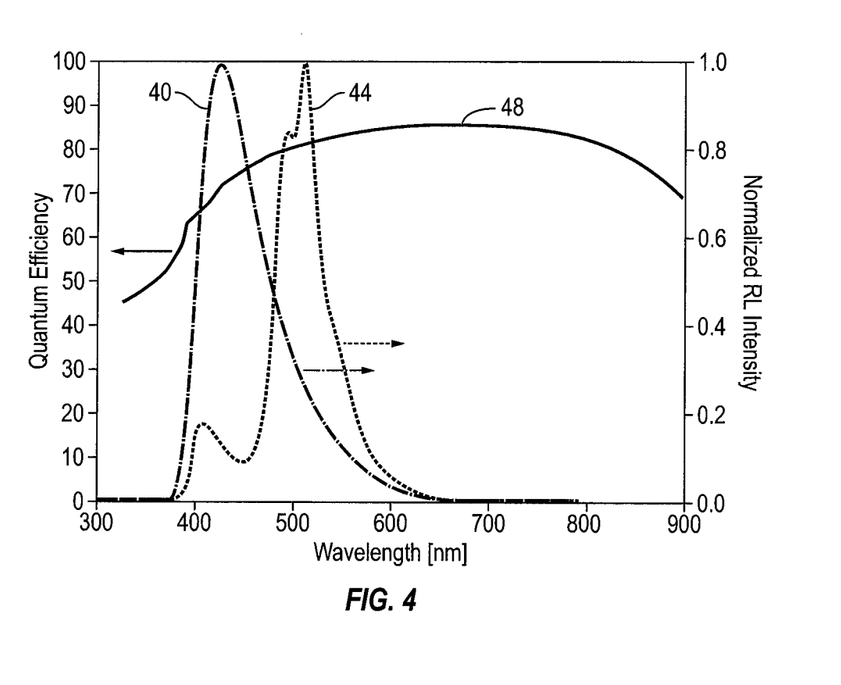
FIG. 4 is a graphical representation of a wavelength shift of emitted light from a scintillator in accordance with an alternative embodiment of the present invention.

As shown in FIG. 4, the example scintillator/wavelength-shifting portion 30 shown in FIG. 3 results in a substantial wavelength shift of the emitted photons 22 directed at the photodetector 18. As shown in FIG. 4, the wavelength-shifting portion 16 that is optically coupled to the scintillator 14 results in a red-shift (the original wavelength is shown as 40 and the shifted wavelength is shown as 44) and achieves a greater spectral overlap with the typical quantum efficiency spectrum 48 of a photodetector 18. As shown, the red-shift improves the spectral overlap of the emitted light with the quantum efficiency response 48 of the photodetector 1, which results in improved detection capabilities in the radiation detector 10.

In particular, FIG. 4 shows a radio-luminescence (RL) spectrum of the coated YSO:Ce crystal (depicted in FIG. 3) and an uncoated YSO:Ce reference crystal obtained under irradiation with a 25 keV endpoint energy X-ray source. The uncoated YSO:Ce crystal exhibits the typical blue scintillation emission peaking around 425 nm (see 40). In the coated YSO:Ce crystal (see 44), the BPEA dye has absorbed the majority of the blue $Ce^{3+}$ emission and converted it to green emission centered around 510 nm, a wavelength range that is better matched with the quantum efficiency response 48 of the photodetector 18. For purposes of the example configuration, a Hamamatusu S8664-1010 avalanche photodiode was used to demonstrate the positive effect of the wavelength shift.

Figure 5:
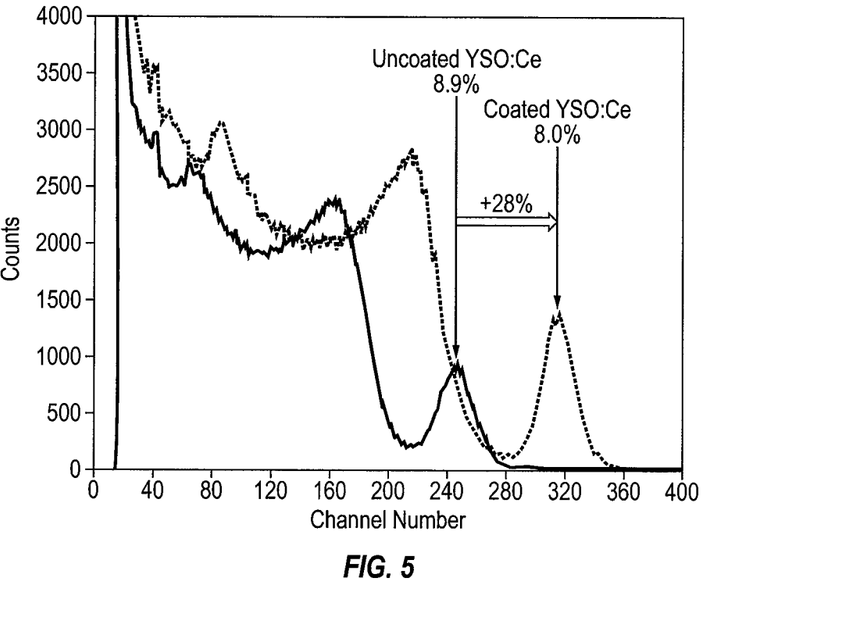
FIG. 5 is a graphical representation of pulse height spectra of a coated and uncoated scintillator crystal in accordance with an alternative embodiment of the present invention.

The same samples were measured under irradiation with a $^{137}$Cs source and the sixth crystal face coupled to a Hamamatsu S8664-1010 avalanche photodiode with optical grease. The respective pulse-height spectra are shown in FIG. 5. The BPEA:PS coated YSO:Ce crystal shows a 28% higher photo-electron collection than the uncoated YSO:Ce crystal, resulting in an enhancement of the energy resolution from 8.9% to 8.0% (a 10% improvement). The data also suggests that the intrinsic quantum efficiency of the BPEA dye in PS is high.

Figure 6:
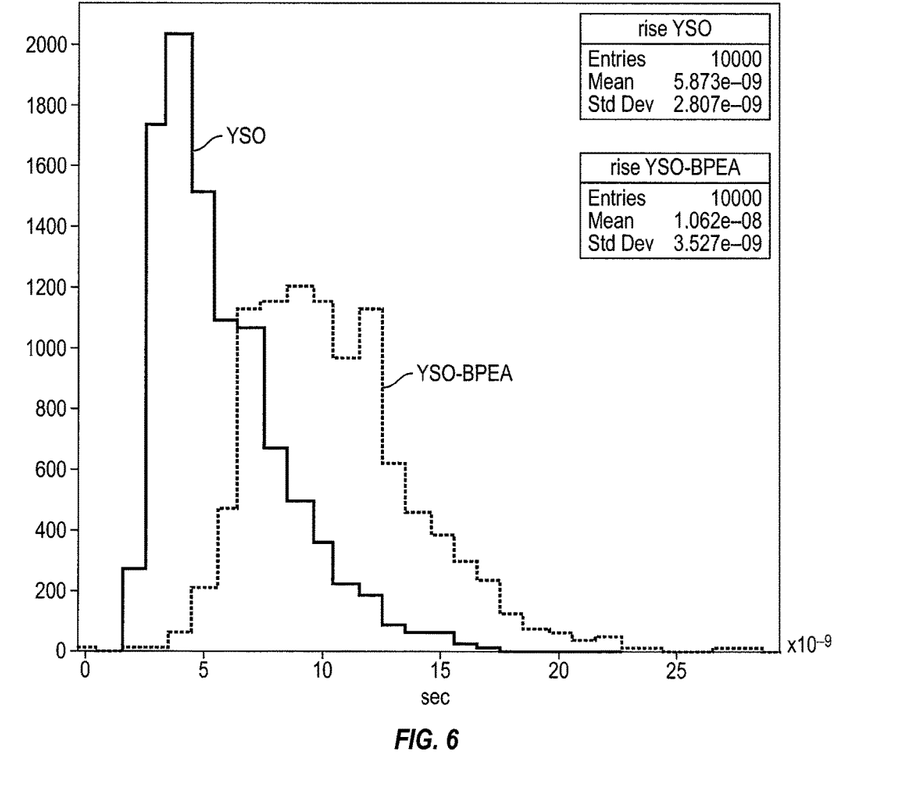
FIG. 6 is a graphical representation of a time response of a wavelength shifted scintillator in accordance with an alternative embodiment of the present invention.
Figure 7:
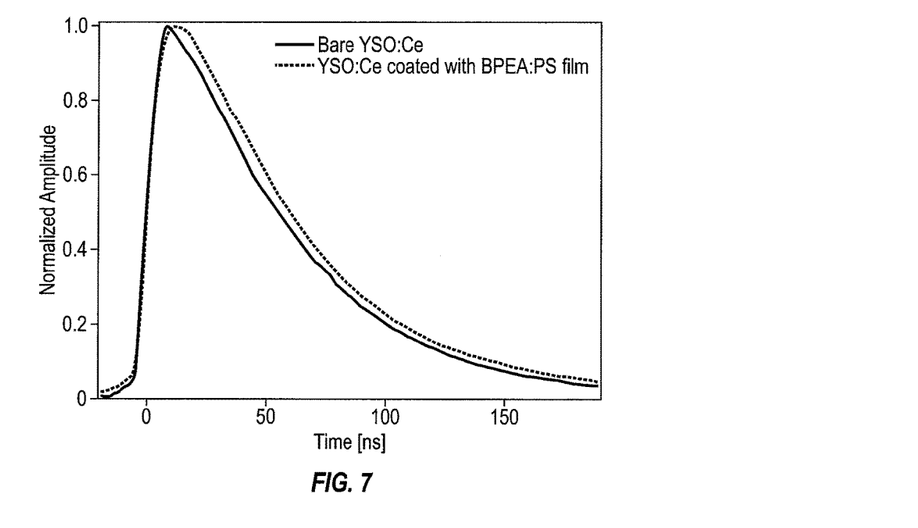
FIG. 7 illustrates the decay time response of scintillation events in the coated and uncoated YSO:Ce detectors according to an embodiment of the present invention.

FIG. 6 illustrates the rise time response of scintillation events in the coated and uncoated YSO:Ce detectors. The mean rise time constants increased from 5.9±2.8 ns for the uncoated YSO:Ce crystal to 10.6±3.5 ns for the coated YSO:Ce crystal, an effect that is due to the reabsorption-reemission process being active in the BPEA:PS coating. FIG. 7 illustrates the decay time response of scintillation events in the coated and uncoated YSO:Ce detectors. The BPEA:PS coating does not introduce a noticeable increase in the decay time of the scintillation events that is intrinsic to the YSO:Ce crystal. This is to illustrate that the application of a wavelength-shifting portion may largely preserve the time response of the scintillator. This is a desired property as it preserves key detector performance characteristics such as count-rate capability, linearity, and energy resolution. This property is also desired in detector schemes that utilize the decay characteristics of the scintillation events to distinguish between different types of incident radiation, such as the use of pulse-shape discrimination to distinguish between neutrons and gamma rays.

As described herein, the example radiation detector and variations thereof have shown an efficient wavelength-shifting portion capable of converting blue YSO:Ce luminescence to the green spectral region for an improved spectral match with the quantum efficiency of an avalanche photodiode photodetector. This resulted in a substantial improvement of the photo-electron collection and energy resolution without significant degradation of the intrinsic scintillator time response.

The example approach involved fabricating a separate optimized wavelength-shifting structure and then applying it to a scintillator crystal, which can be expected to be particularly advantageous when working with hygroscopic scintillators such as LaBr$_3$:Ce, LaCl$_3$:Ce, CLYC:Ce, or SrI$_2$:Eu as it eliminates the need for applying a coating directly to the scintillator and potentially inducing chemical degradation of the scintillator surface.

Figure 8:
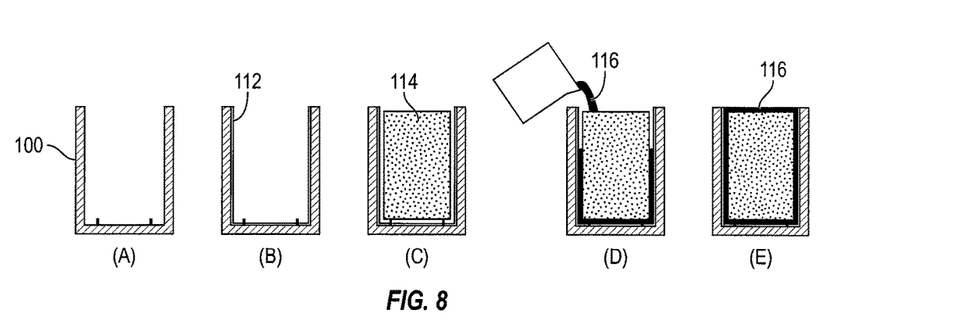
FIG. 8 illustrates an alternate method of realizing a wavelength-shifting portion according to an embodiment of the present invention.

FIG. 8 illustrates an alternate method of realizing a wavelength-shifting portion. A mold 100 of desired shape (A) is lined with a desired reflector material 112 (B) and the scintillator 114 is placed inside the mold cavity (C). A liquid wavelength-shifting material 116 is then poured into the mold to fill the remaining void space (D). If desired, the liquid wavelength-shifting material may be solidified for example by cooling, optical polymerization, thermal polymerization, or any other suited method (E).

As shown in FIGS. 1-3, for example, the scintillator 14 and wavelength-shifting portion 16 can be surrounded by an optically reflective material 12 for the purpose of containing the light within the scintillator and wavelength-shifting material and increasing the fraction of light that reaches the photodetector 18 that is optically coupled to the assembly. Optically reflective material 12 can include specular reflector such as metallic or dielectric mirrors, diffuse reflectors such as TiO$_2$, Teflon, or Spectralon™, or any combination thereof. Some degree of diffuse reflection may be desired in order to reduce the trapping of light inside the assembly consisting of the scintillator and the wavelength-shifting portion. In some embodiments it may be desired to introduce an air gap, or any other layer of lower refractive index, between the wavelength-shifting portion and the reflector surface such as to preserve total internal reflection for transporting a portion of the scintillation light without loss to the photodetector. Those skilled in the art will appreciate that the reflector embodiments and variations thereof can aid in maximizing the fraction of emitted light that is transported to the photodetector.

As noted above, other alternatives to the radiation detector can include coatings including two dyes to enable larger two-step wavelength shifts that will be useful to convert the emission of scintillators that emit in the deep UV (e.g. LiCAF:Ce) to a wavelength region suited for detection with chip-type photodetectors. Such multi-step wavelength shifts can be achieved with layering multiple coatings each including a single dye or, alternatively, doping a single coating with multiple dyes, or a combination thereof. Those of skill in the art will appreciate that the embodiments and variations thereof make a wide range of high-performance neutron/gamma scintillators available for use with a large variety of compact and high performance photodetectors, including for example silicon photomultipliers and avalanche photodiodes.

As described above, a radiation detector according to various embodiments yields substantial improvements in efficiencies and engineering possibilities by wavelength-shifting a scintillated photon to a portion of the spectrum that is better matched with the quantum efficiencies of today's advanced photodetectors.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices, processors, and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A radiation detector comprising:
   a scintillator;
   a wavelength shifting portion to cause a wavelength shift in photons emitted by the scintillator; and
   a photodetector optically coupled to the scintillator to receive the wavelength shifted photons,
   wherein:
      the wavelength shifting portion surrounds at least five sides of the scintillator; or
      an optically reflective material surrounds the wavelength shifting portion.

2. The radiation detector of claim 1, wherein the wavelength shifting portion comprises a coating comprising at least two dyes.

3. The radiation detector of claim 1, wherein the wavelength shifting portion comprises a coating comprising 9.10-Bis(phenylethynyl)anthracene doped, polystyrene (BPEA:PS).

4. The radiation detector of claim 1, wherein the scintillator comprises an YSO:Ce crystal.

5. The radiation detector of claim 1, wherein the photodetector comprises one of a silicon photomultiplier or an avalanche photodiode.

6. The radiation detector of claim 1, wherein the wavelength shifting portion comprises a congruent fabricated structure.

7. The radiation detector of claim 6, wherein the scintillator comprises a hygroscopic scintillator.

8. The radiation detector of claim 7, wherein the hygroscopic scintillator comprises one of: $LaBr_3$:Ce, $LaCl_3$:Ce, CLYC:Ce, or $SrI_2$:Eu.

9. The radiation detector of claim 8, wherein the photodetector comprises one of a silicon photomultiplier, avalanche photodiode, or PIN diode.

10. The radiation detector of claim 1, wherein the scintillator comprises LiCAF:Ce and the wavelength shifting portion comprises a coating comprising at least two dyes applied to one or more sides of the scintillator.

11. The radiation detector of claim 1, wherein the optically reflective material surrounds the wavelength shifting portion.

12. A radiation detector comprising:
   a scintillator;
   a wavelength shifting portion surrounding at least five sides of the scintillator to cause a wavelength shift in photons emitted by the scintillator;
   a photodetector optically coupled to the scintillator to receive the wavelength shifted photons; and
   an optically reflective material surrounding the wavelength shifting portion.

13. The radiation detector of claim 12, wherein the wavelength shifting portion comprises a coating comprising 9.10-Bis(phenylethynyl)anthracene doped, polystyrene (BPEA:PS).

14. The radiation detector of claim 12,
   wherein the scintillator comprises an YSO:Ce crystal, and
   wherein the photodetector comprises one of a silicon photomultiplier or an avalanche photodiode.

15. The radiation detector of claim 12,
   wherein the wavelength shifting portion comprises a congruent fabricated structure, and
   wherein the scintillator comprises a hygroscopic scintillator.

16. The radiation detector of claim 15,
   wherein the hygroscopic scintillator comprises one of: $LaBr_3$:Ce, $LaCl_3$:Ce, CLYC:Ce, or $SrI_2$:Eu, and
   wherein the photodetector comprises one of a silicon photomultiplier, avalanche photodiode, or PIN diode.

17. A radiation detector comprising:
   a scintillator;
   a wavelength shifting portion surrounding at least five sides of the scintillator to cause a wavelength shift in photons emitted by the scintillator;
   a photodetector optically coupled to the scintillator to receive the wavelength shifted photons; and
   a processor coupled to the photodetector, the processor being to identify a radiation source.

18. The radiation detector of claim 17,
   wherein the processor being to further identify a location, quantity, and/or quality of the radiation source in accordance with the wavelength shifted photons.

19. The radiation detector of claim 17,
   wherein the wavelength shifting portion comprises a coating comprising 9.10-Bis(phenylethynyl)anthracene doped, polystyrene (BPEA:PS), wherein the scintillator comprises an YSO:Ce crystal, and
wherein the photodetector comprises one of a silicon photomultiplier or an avalanche photodiode.

20. The radiation detector of claim 17,
wherein the wavelength shifting portion comprises a congruent fabricated structure,
wherein the scintillator comprises a hygroscopic scintillator comprising one of: $LaBr_3$:Ce, $LaCl_3$:Ce, CLYC:Ce, or $SrI_2$:Eu, and
wherein the photodetector comprises one of a silicon photomultiplier, avalanche photodiode, or PIN diode.

* * * * *